United States Patent [19]

Witzman et al.

[11] Patent Number: 5,606,601
[45] Date of Patent: Feb. 25, 1997

[54] CENTRALIZING STORAGE AND VERIFICATION ELEMENT FOR TELEPHONE NETWORK

[75] Inventors: Kevin R. Witzman, Monument; Isaac K. Elliott, Colorado Springs; Robert A. Smout, Divide; Arlene M. Plaza; Richard A. Sostheim, both of Colorado Springs, all of Colo.

[73] Assignee: MCI Communications Corporation, Washington, D.C.

[21] Appl. No.: 438,913

[22] Filed: May 10, 1995

[51] Int. Cl.$^6$ .......................... H04M 3/08; H04M 15/00; H04M 3/42

[52] U.S. Cl. .................. 379/113; 379/13; 379/14; 379/15; 379/111; 379/112; 379/114; 379/115; 379/207

[58] Field of Search ...................... 379/1, 13, 14, 379/15, 34, 111, 112, 113, 114, 115, 201, 207, 219, 220

[56] References Cited

U.S. PATENT DOCUMENTS

| | | | |
|---|---|---|---|
| 5,153,907 | 10/1992 | Pugh | 379/114 |
| 5,185,785 | 2/1993 | Funk | 379/115 |
| 5,333,183 | 7/1994 | Herbert | 379/112 |
| 5,343,517 | 8/1994 | Bogart | 379/112 |
| 5,357,564 | 10/1994 | Gupta | 379/112 |

Primary Examiner—Wellington Chin
Assistant Examiner—Vijay Shankar

[57] ABSTRACT

A telephone network has elements that generate application data field (ADF) requests to data access points, requesting routing information for telephone calls. The data access points respond with application data field (ADF) records. A request and responding record constitute an ADF message pair. Call detail records are also generated by network elements during a call. A centralizing storage and verification system (SAVE) replaces prior art adjunct processors. It includes a network data buffer followed by a formatter for the network data that formats the data blocks and identifies them by corresponding sequence numbers. A buffer is provided for the blocked data and corresponding sequence numbers. An archiving hard disk is present for storing the network data blocks and corresponding sequence numbers. An interface expedites bi-directional data communication between the SAVE and an external information concentrator. A first input of the interface is connected to an output of the network data buffer for transferring network data to the concentrator. A second input of the interface is connected to an output of the hard disk for retrieving network data when previous communication of such data to the information concentrator is incomplete, and retransmission is requested by the concentrator. Verification is made of the requested data for retransmission, thus connecting only verified retransmitted network data to the interface for retransmission to the information concentrator.

7 Claims, 5 Drawing Sheets

FIG. 4
GLOSSARY OF ABBREVIATIONS

| | | | | |
|---|---|---|---|---|
| ABF | ADF BLOCK FORMATTER | | MOSR | MATCHED OPERATOR SERVICE RECORD |
| ABS | ADF BLOCK STORAGE MANAGER | | NER | NIC EVENT RECORD |
| ADF | APPLICATION DATA FIELD | | NIA | NETWORK INFORMATION ARCHITECTURE |
| AP | ADJUNCT PROCESSOR | | NIC | NETWORK INFORMATION CONCENTRATOR |
| API | APPLICATION PROGRAMMING INTERFACE | | OS LEVEL | OPERATOR SERVICE LEVEL |
| ARP | ADF RECORD PROCESSOR | | OSR | OPERATOR SERVICE RECORD |
| BDR | BILLING DATA RECORD | | RRM | RETRANSMISSION REQUEST MANAGER |
| BSN | BLOCK SEQUENCE NUMBER | | SAM | SYSTEM ADMINISTRATION AND MAINTENANCE |
| CDR | CALL DETAIL RECORD | | SAVE | STORAGE AND VERIFICATION ELEMENT |
| CR | CENTRAL RETRANSMITTER | | SDI | SAVE-TO-DAP INTERFACE |
| DAP | DATA ACCESS POINT | | SER | SWITCH EVENT RECORD |
| DBMS | DATABASE MANAGEMENT SYSTEM | | SLI | SAVE-TO-LSE INTERFACE |
| DCM | DTS COMMUNICATION MANAGER | | SNI | SAVE-TO-NIC INTERFACE |
| DTS | DAP TRAFFIC STATISTICS | | SRS | SECURITY ROUTING SERVICES |
| E/P/EP | EXTENDED/PRIVATE/EXTENDED PRIVATE | | TCP/IP | TRANSMISSION CONTROL PROTOCOL/INTERNET PROTOCOL |
| FMS | FRAUD MANAGEMENT SYSTEM | | TLM | TRANSMISSION LINK MONITOR |
| GSL | GENERALIZED STATISTICS LIBRARY | | UI | USER INTERFACE |
| IPC | INTER-PROCESS COMMUNICATION | | VOS | VIRTUAL OPERATING SYSTEM |
| ISP | INTELLIGENT SERVICES PLATFORM | | | |
| LSE | LOCAL SUPPORT ELEMENT | | | |

5,606,601

CENTRALIZING STORAGE AND VERIFICATION ELEMENT FOR TELEPHONE NETWORK

RELATED APPLICATION

The present application relates to co-pending applications: Ser. No. 08/426,256, filed Apr. 21, 1995 entitled "Network Information Concentrator"; and Ser. No. 08/438,931, filed Jul. 13, 1995 entitled "Network Information Architecture Having Centralizing Storage and Verification Element".

FIELD OF THE INVENTION

The present invention relates to phone networks, and more particularly to a system for storing call event records and verifying requests for retransmission of missing records.

BACKGROUND OF THE INVENTION

FIG. 1 is a generalized prior art elementary telecommunications network showing the path between a call originating point, for example, origination phone 6, and the network such as the MCI network, which will be the assumed network for this disclosure. Typically, a call from an origination phone 6 is handled by a local exchange carrier LEC 8. If, for example, an 800 toll-free number is dialed by the origination phone 6, the LEC 8 recognizes that MCI is the carrier for this particular 800 number. Consequently, the call is routed via line 9 to the MCI origination switch 10. This is the entry point of the call into the MCI network, and further routing may be necessary. However, in order to simplify the discussion of the present invention, simply routing through the switch 10 is presumed. Typically, switches of the type discussed are well-known in the art and identified, by way of example, as a DEX 600E switch, manufactured by Digital Switch Corporation, or alternatively a DMS 250 manufactured by Northern Telecom Corporation. International switches are provided by Ericcson Limited. The switch 10 has an adjunct processor (AP) 14 associated with it. The purpose of the adjunct processor is to receive call detail records (CDR) from the switch and collect them in buffers. Adjunct processors are of the type manufactured by Stratus, once marketed by IBM, and identified as a System 88 processor. This system later became a Stratus XA 2000, which may be used. Each switch in the network, such as switch 11, has an adjunct processor associated with it.

The call detail records are employed by various applications run by the network. For example, cloned data is provided along line 16 to a billing application 18 which posts the normal billing information for calls made by customers. Additional conventional applications include the acquisition of traffic statistics 24, as well as network management 28. Each of these applications utilizes specific data fields within the CDR data cloned by the involved adjunct processor 14. As will be appreciated, in a complicated network, each adjunct processor must communicate with each application so that the number of outputs from each AP, as well as the total number of inputs to the various applications, becomes unwieldy and difficult to manage from a hardware and software point of view.

Users of the various applications 18, 24 and 28 are schematically indicated by box 22. These may be databases of the MCI network or databases of customers who selectively load data from one or more applications. For example, a large corporate customer (user) may wish to monitor statistics regarding toll-free 800 number calls for which it is being billed. The traffic statistics application 24 includes such data for the customer which is extracted from the call detail records (CDR) provided by the various adjunct processors in the system.

The conventional data access point (DAP) 32 controls the routing of calls between network switches. The DAP also may block a call if it is unauthorized, or if network conditions warrant such blocking. The DAP is basically a large processor based database that includes customer profile information. The DAP stores call origination information, including such data as origination phone number, time of day a call was made, etc.

BRIEF DESCRIPTION OF THE PRESENT INVENTION

The present invention is directed to a Storage And Verification Element (SAVE) that replaces adjunct processors 14. A SAVE is connected at its input to a number of switches and network elements for collecting network event information into a logically centralized location. A network information concentrator (NIC) has its inputs connected to the outputs of each SAVE. An important function of the NIC is generating retransmission of data from SAVEs in the event that data gaps or duplicates are detected. The result is assurance of data integrity as early in the call record process as possible.

BRIEF DESCRIPTION OF THE FIGURES

The above-mentioned objects and advantages of the present invention will be more clearly understood when considered in conjunction with the accompanying drawings, in which:

FIG. 4 is a glossary of abbreviations included in the following description of the invention.

Figure 1:
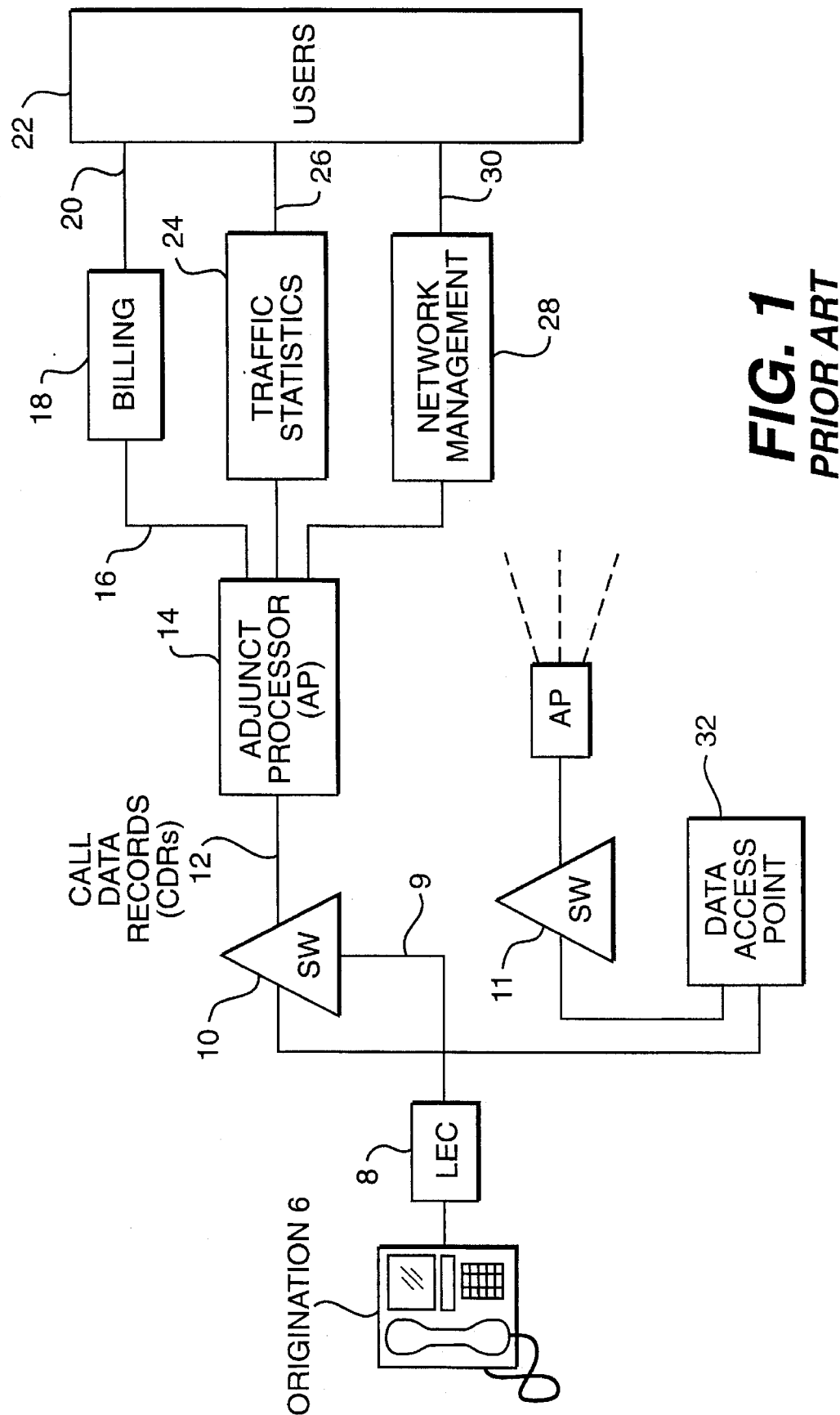
FIG. 1 is a block diagram of prior art network information architecture indicating the connections between an adjunct processor and various data applications.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar maimer to accomplish a similar purpose.

DETAILED DESCRIPTION OF THE INVENTION

It is pointed out that FIG. 4 is a glossary of abbreviations used in this description.

Figure 2:
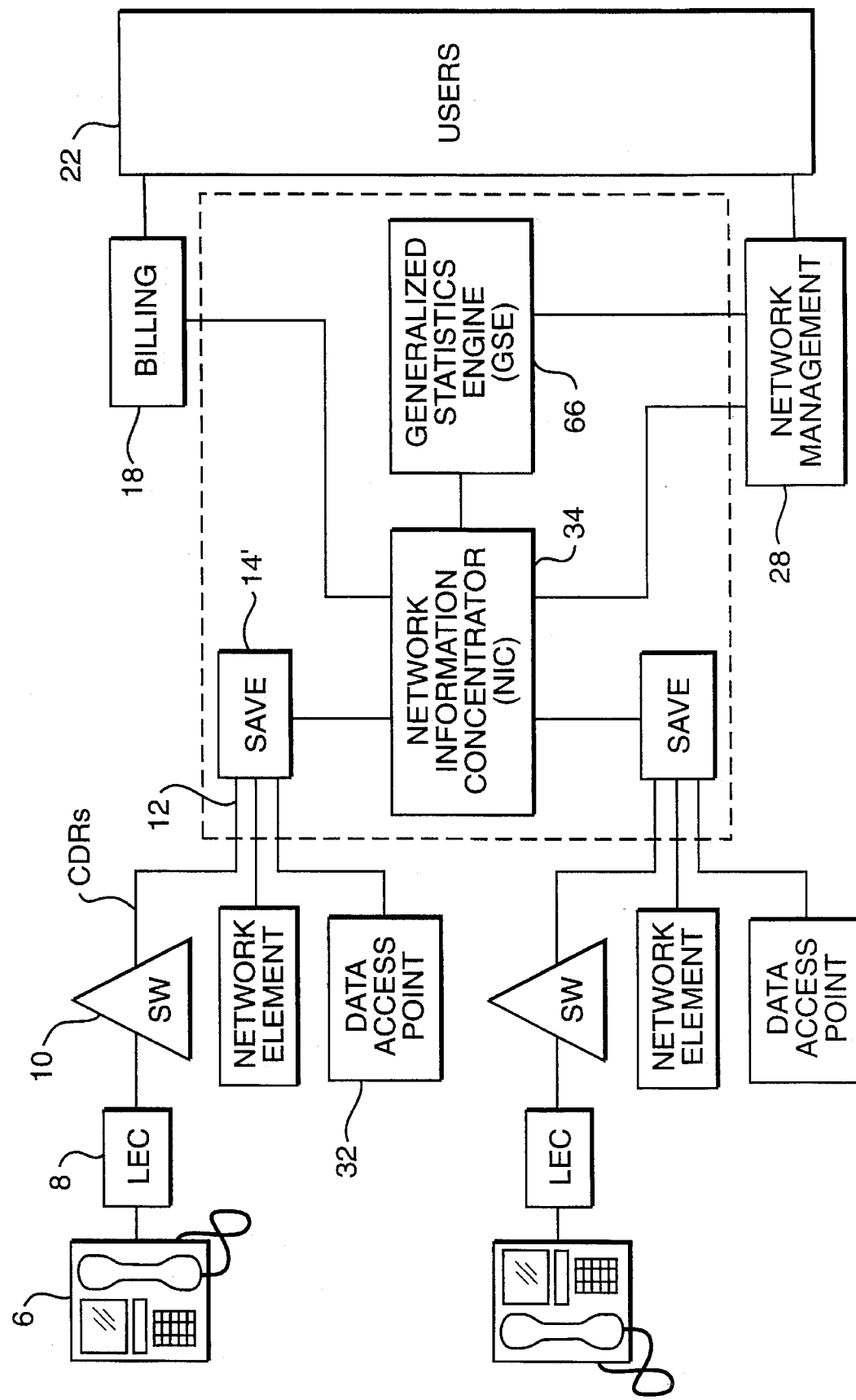
FIG. 2 is a block diagram of the present invention indicating the inclusion of a network information concentrator between SAVEs and data applications.

FIG. 2 illustrates the substitution of SAVEs for prior art APs in a network. As in the case of the prior art, an originating point, for example phone 6, communicates via a local exchange carrier LEC 8 to the network. If an 800 toll-free number is dialed by the origination phone 6, the LEC 8 recognizes the network to handle the call, for example, MCI. As a result, the call is routed to an MCI origination switch 10. This is the entry point of the call into the MCI system, and further routing is normally required. A data access point 32 provides this function. A number of switches and other network elements feed data (12) to a corresponding Storage and Verification Element (SAVE) 14' which stores and distributes the data (33) to a consolidation system, referred to as the network information concentrator 34 (NIC), which is the subject matter of the previously identified co-pending application find incorporated by reference herein. Other types of network elements may include an enhanced voice services platform or an intelligent services network platform. The latter subject is discussed in an article by Richard Robrock entitled "The Intelligent Network—Changing the Face of Communications" published in the *Proceedings of the I.E.E.E.*, Vol. 79, No. 1, January 1991.

The output of each SAVE 14' is preferably connected to an input of a distributed group of processors constituting the network information concentrator. The purpose of the concentrator is to compress and filter data supplied thereto, on an applications basis. By that it is meant that the concentrator 34 selects certain types of data fields from all of the data supplied to it, as required by a particular application (e.g., billing 18), which may then be employed by a user (22) (customer). As will be observed from FIG. 2, a single point of access to the applications is provided to transfer data from all network elements served. For the most part, the data format for the various applications is uniform so that the NIC 34 deals with standardized communications for the applications.

Figure 3A:
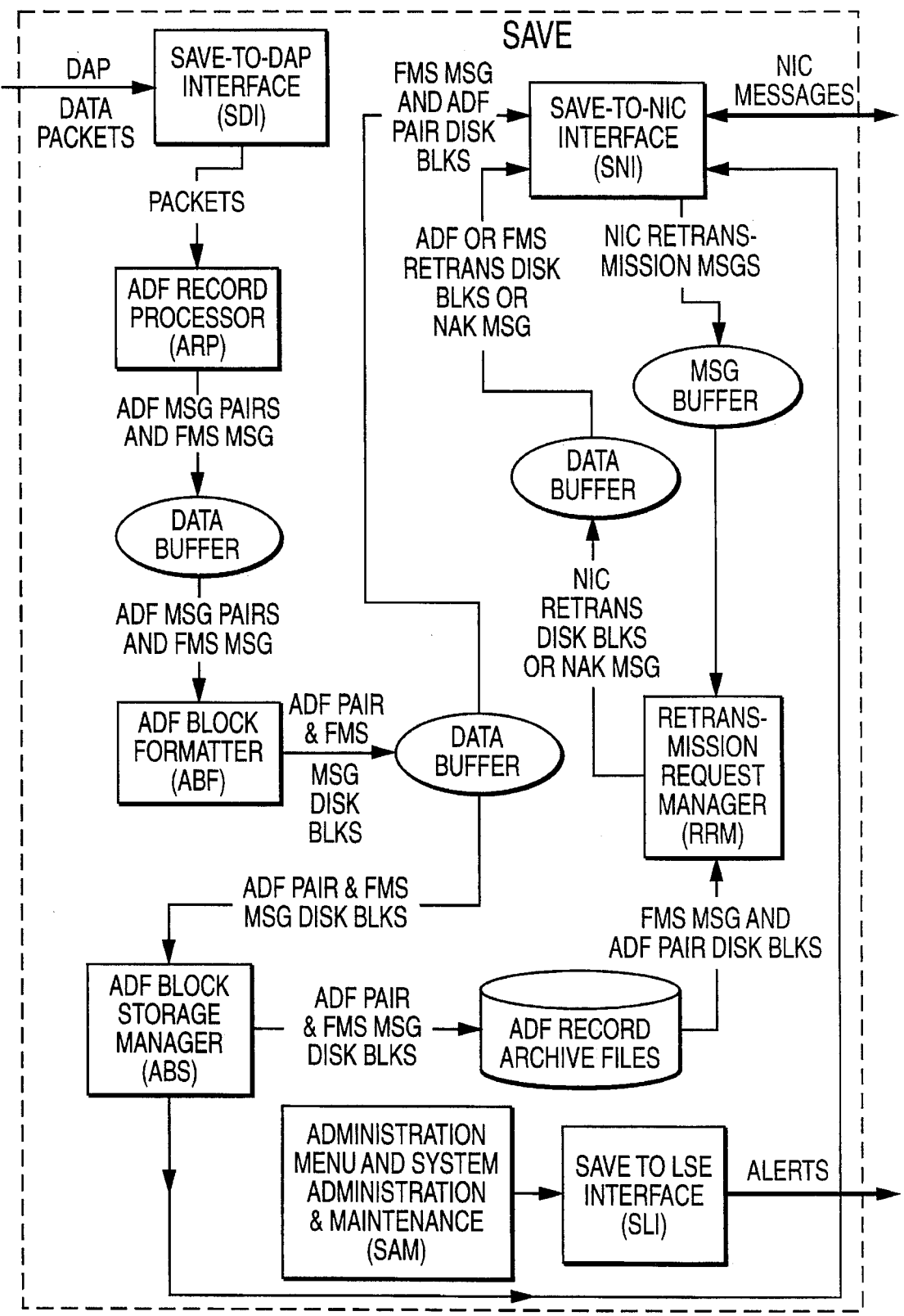
FIG. 3A is a data flow diagram of the SAVE connected at its input to a DAP.

FIG. 3A is a system block diagram of the SAVE system illustrating data flow. An input to the SAVE is, for illustrative purposes, indicated as network packets of data output from a DAP (see 32 in FIG. 2). A corresponding discussion appears later, in connection with inputs from a network switch (FIG. 3B) instead of a DAP.

A SAVE-to-DAP interface (SDI) introduces the packets into the SAVE, and more particularly to an ADF Record Processor (ARP) which extracts raw data from packets. Particularly, this subsystem is responsible for disassembling the input data packet into its constituent applied data field (ADF) message pairs. The message pairs are then stored in a data buffer along with other types of preselected messages, such as messages from a Fraud Management System (FMS), included in the data network but not discussed herein. After buffering, the message pairs and FMS message is input to an Applied Data Field Block Formatter (ABF) which reads the queued ADF message pairs and the FMS message and creates disk blocks of a preselected size, padding out the disk block as needed. This subsystem also sets a block sequence number by which the block will be referenced in the future. The resulting block is then queued in a data buffer which splits the disk blocks. One path for the disk blocks is a SAVE-to-NIC interface (SNI) which generates messages for the NIC corresponding to the disk blocks. The disk blocks are also input to an ADF Block Storage Manager (ABS) which is responsible for archiving, on the indicated ADF record archive files, the blocks containing ADF message pairs and FMS messages to an appropriate disk data file. This is indicative of the first major function, namely storage, for the SAVE. The ABS maintains information pertaining to the sequence numbers of the data blocks written to the disks to support block retransmission. The ABS has a second output, constituting a confirmation message that is input to the SNI which enables the transmission of NIC messages. There are instances in network operation when it is necessary to retransmit ADF message pair data to the NIC. The SNI would receive such retransmission requests from the NIC and process such requests to a Retransmission Request Manager (RRM), after buffering in the indicated message buffer. The RRM verifies the validity of the request. This is indicative of the second major function of the SAVE, namely verification of retransmission requests. If the request is for a valid file and the start and end block sequence numbers are also valid, the requested data for transmission is retrieved from the hard disk where the data was stored (ADF Record Archive Files) and, after data buffering, is input to a retransmission input of the SNI for transmission to the NIC. In the event the data, requested for transmission, is impossible to retrieve, a negative acknowledgement message (NAK) is generated by the RRM and handled by the SNI as a response to the NIC.

Figure 3B:
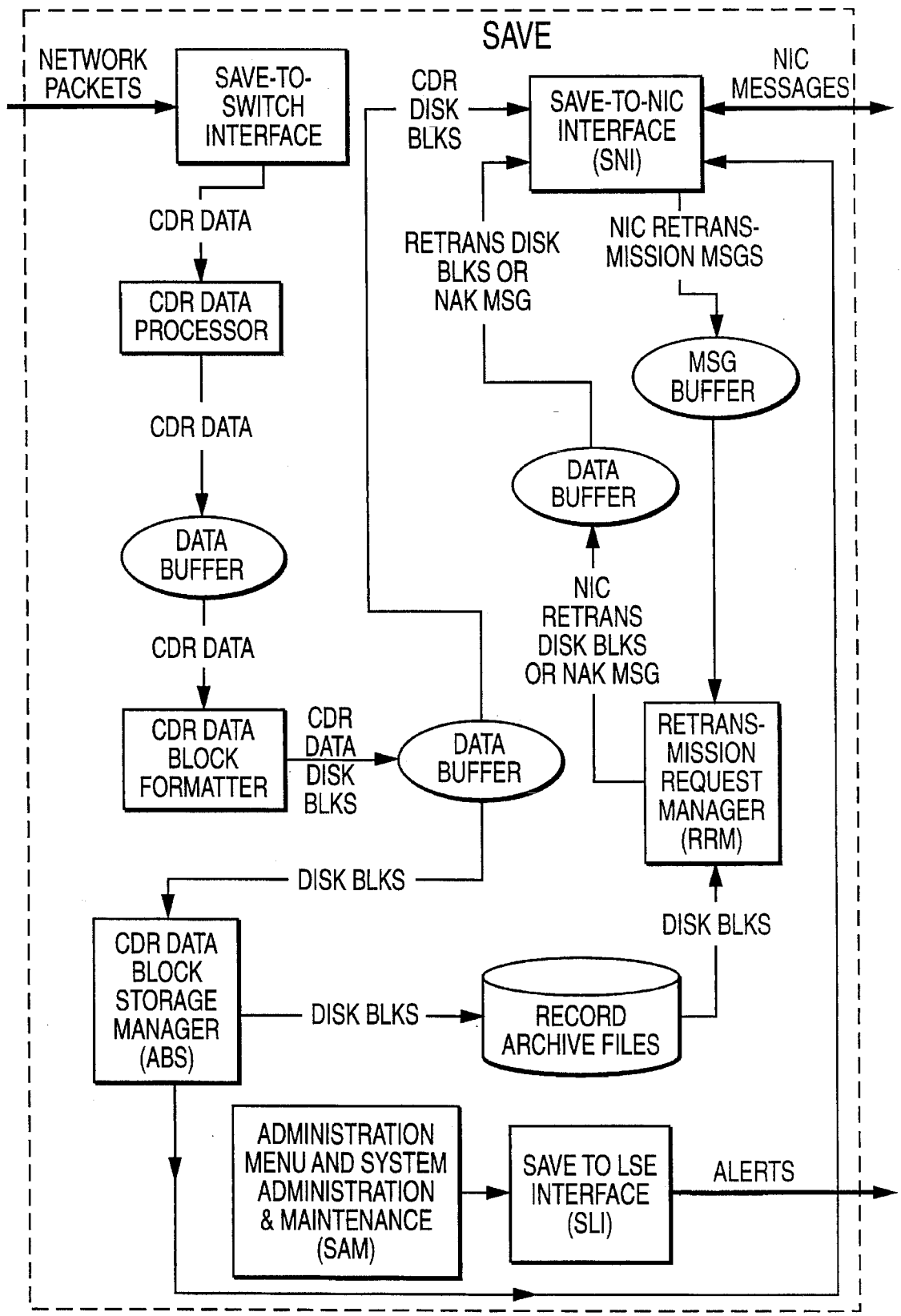
FIG. 3B is a data flow diagram of the SAVE connected at its input to a network switch.

In order to orchestrate all system administration, alarm processing and resource management, a processor, such as, but not necessarily, the IBM Netview 6000 is employed. Functionally, this processor is indicated in FIG. 3B as the Administration Menu And System Administration And Maintenance (SAM) box. Typically, administration menus are generated for system operators which allow the monitoring of the system and detection of alarm conditions. These types of processes are well-known in the art and are currently used in conjunction with DAPs.

The SAVE-to-LSE Interface (SLI) subsystem retrieves system alerts sent to it by the SAM and sends alert messages to an appropriate network component (not shown) such as a local support element (LSE). Typically, such alerts are transmitted to an LSE via a TCP/IP protocol connection.

FIG. 3B is similar to that of FIG. 3A and indicates the SAVE processes when connected to a network switch 10 instead of a DAP, as indicated in FIG. 2. The input to the SAVE will be network packets relating to switch call detail record data (CDR) instead of ADF pair and FMS messages, as was the case for the system of FIG. 3A. Other than the type of data processed within the SAVE, the operation of this system remains identical.

It should be understood that the invention is not limited to the exact details of construction shown and described herein for obvious modifications will occur to persons skilled in the art.

We claim:

1. In a telephone network having elements that generate network data in the form of (1) application data field (ADF) requests to data access points, requesting routing information for telephone calls, the data access points responding with application data field (ADF) records, a request and responding record constituting an ADF message pair; or (2) call detail records generated by network elements during a call, a storage and verification system (SAVE) comprising:

means for buffering the network data;

means for formatting the network data into data blocks, identified by corresponding sequence numbers;

means for buffering the blocks of network data and corresponding sequence numbers;

means for storing the network data blocks and corresponding sequence numbers;

interface means for providing bi-directional data communication between the SAVE and an external information concentration means;

a first input of the interface means connected to an output of the network data buffering means for transferring network data to the external information concentration means;

a second input of the interface means connected to an output of the storing means for retrieving network data when communication of such data to the external information concentration means is incomplete, and retransmission is requested by the external information concentration means; and means connected between the storing means and the interface means for verifying the correctness of the requested data for retransmission, thus connecting only verified retransmitted network data to the interface means for retransmission to the external information concentration means.

2. The system set forth in claim 1 wherein the network elements generate bundled blocks of call detail records and corresponding sequence numbers, presented at a second interface, located at an input to the SAVE, the SAVE receiving the sequence numbers and the blocks for subsequent deblocking;

the sequence numbers of the deblocked data being analyzed by the SAVE to verify that data is neither duplicated nor missing;

wherein the data is reblocked with new sequence numbers by the formatting means.

3. In a telephone network having elements that generate application data field (ADF) requests to data access points, requesting routing information for telephone calls, the data access points responding with application data field (ADF) records, a request and responding record constituting an ADF message pair, a storage and verification system (SAVE) comprising:

means for buffering the message pair;

means for formatting the message pair into data blocks, identified by corresponding sequence numbers;

means for buffering the blocks of message pairs and corresponding sequence numbers;

means for storing the message pair blocks and corresponding sequence numbers;

interface means for providing bi-directional data communication between the SAVE and an external information concentration means;

a first input of the interface means connected to an output of the message pair buffering means for transferring message pair blocks and corresponding sequence numbers to the external information concentration means;

a second input of the interface means connected to an output of the storing means for transferring message pair blocks when communication thereof to the external information concentration means is incomplete, and retransmission is requested by the external information concentration means; and means connected between the storing means and the interface means for verifying the correctness of the request for retransmission, thus connecting only verified retransmitted message pair blocks to the interface means for retransmission to the external information concentration means.

4. In a telephone network having elements that generate call detail records (CDRs) during a call, a storage and verification system (SAVE) comprising:

means for buffering the CDRs;

means for formatting the CDRs into data blocks, identified by corresponding sequence numbers;

means for buffering the data blocks of CDRs and corresponding sequence numbers;

means for storing the CDR data blocks and corresponding sequence numbers;

interface means for providing bi-directional data communication between the SAVE and an external information concentration means;

a first input of the interface means connected to an output of the CDR buffering means for transferring CDRs to the external information concentration means;

a second input of the interface means connected to an output of the storing means for retrieving CDRs when communication thereof to the external information concentration means is incomplete, and retransmission is requested by the external information concentration means; and means connected between the storing means and the interface means for verifying the correctness of the request for retransmission, thus connecting only verified retransmitted CDR data blocks to the interface means for retransmission to the external information concentration means.

5. In a telephone network having elements that generate application data field (ADF) requests to data access points, requesting routing information for telephone calls, the data access points responding with application data field (ADF) records, a request and responding record constituting an ADF message pair, a method for storage and verification of message pairs comprising the steps:

buffering the message pair;

formatting the message pair into data blocks, identified by corresponding sequence numbers;

buffering the blocks of message pair and corresponding sequence numbers;

storing the message pair blocks and corresponding sequence numbers;

providing bi-directional data communication to an external information concentrator;

transferring buffered message pair blocks and corresponding sequence numbers to the external information concentrator;

transferring stored message pair blocks and sequence numbers to the external information concentrator when prior communication thereof to the external information concentrator is incomplete, and retransmission is requested by the external information concentrator; and verifying the correctness of the request for retransmission, thus transferring only verified retransmitted message pair blocks to the external information concentrator.

6. In a telephone network having elements that generate call detail records (CDRs) during a call, a method for storing and verifying the CDRs comprising:

buffering the CDRs;

formatting the CDRs into data blocks, identified by corresponding sequence numbers;

buffering the data blocks of CDRs and corresponding sequence numbers;

storing the CDR data blocks and corresponding sequence numbers;

providing bi-directional data communication to an external information concentrator;

transferring buffered CDR data blocks to the external information concentrator;

transferring stored CDR data blocks to the external information concentrator when prior communication thereof to the external information concentrator is incomplete and retransmission is requested by the external information concentrator; and verifying the correctness of the request for retransmission, thus transferring only verified retransmitted CDR data blocks to the external information concentrator.

7. The method set forth in claim 6 wherein the network elements generate bundled blocks of call detail records and corresponding sequence numbers, presented at an initial input, the blocks being subsequently deblocking;

analyzing the deblocked data to verify that records are neither duplicated nor missing;

reblocking the verified records with new sequence numbers during the formatting step.

* * * * *